US006960623B2

(12) United States Patent
Gorny et al.

(10) Patent No.: US 6,960,623 B2
(45) Date of Patent: Nov. 1, 2005

(54) COMPOSITIONS CONTAINING POLYCARBONATE

(75) Inventors: Rüdiger Gorny, Krefeld (DE); Siegfried Anders, Köln (DE); Wolfgang Nising, St. Augustin (DE)

(73) Assignee: Bayer Aktiengesellschaft, Leverkusen (DE)

( * ) Notice: Subject to any disclaimer, the term of this patent is extended or adjusted under 35 U.S.C. 154(b) by 209 days.

(21) Appl. No.: 10/297,378

(22) PCT Filed: May 28, 2001

(86) PCT No.: PCT/EP01/06060

§ 371 (c)(1), (2), (4) Date: Dec. 5, 2002

(87) PCT Pub. No.: WO01/94486

PCT Pub. Date: Dec. 13, 2001

(65) Prior Publication Data

US 2003/0158300 A1 Aug. 21, 2003

(30) Foreign Application Priority Data

Jun. 8, 2000 (DE) ........................................ 100 28 412

(51) Int. Cl.[7] ...................... C08K 5/3492; C08K 5/103; C08K 5/52

(52) U.S. Cl. ....................... 524/100; 524/153; 524/291; 524/311

(58) Field of Search ................................ 524/100, 153, 524/291, 311

(56) References Cited

U.S. PATENT DOCUMENTS

| | | | | |
|---|---|---|---|---|
| 4,670,479 A | | 6/1987 | Miyauchi | 524/154 |
| 4,845,193 A | | 7/1989 | Umemura et al. | 528/502 |
| 5,108,835 A | | 4/1992 | Hähnsen et al. | 428/334 |
| 5,228,778 A | | 7/1993 | Nakatani | 374/33 |
| 5,597,854 A | | 1/1997 | Birbaum et al. | 524/100 |
| 5,807,914 A | * | 9/1998 | Obayashi et al. | 524/267 |
| 5,856,012 A | | 1/1999 | Kühling et al. | 428/412 |
| 6,004,678 A | | 12/1999 | Jaatinen et al. | 428/410 |

FOREIGN PATENT DOCUMENTS

| | | |
|---|---|---|
| EP | 0 110 221 | 4/1987 |
| JP | 9-57813 | 3/1997 |
| JP | 9-57881 | 3/1997 |
| JP | 9-176476 | 7/1997 |
| WO | 99/05205 | 2/1999 |

* cited by examiner

*Primary Examiner*—Tae H. Yoon
(74) *Attorney, Agent, or Firm*—Joseph C. Gil; Aron Preis

(57) ABSTRACT

A thermoplastic molding composition especially suitable for preparing extruded articles is disclosed. The composition contains polycarbonate, a fatty acid ester and a triazine conforming to formula (I)

(I)

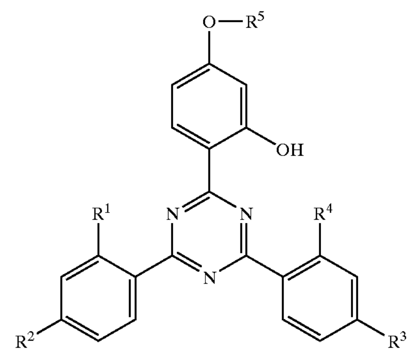

wherein $R^1$, $R^2$, $R^3$ and $R^4$ independently one of the others is selected from the group consisting of $C_1$–$C_8$-alkyl, halogen and —CN, and where $R^5$ is H or $C_1$–$C_{20}$-alkyl.

12 Claims, No Drawings

COMPOSITIONS CONTAINING POLYCARBONATE

The present invention relates to the use of specific triazines in the preparation of compositions containing polycarbonate and those triazines and fatty acid esters, and to the compositions, to a method of producing products containing those compositions, and to those products.

Polycarbonate sheets are known from EP-A 0 110 221 and are made available for a large number of applications. They are produced, for example, by extrusion of compositions containing polycarbonate and, optionally, by co-extrusion with further compositions containing polycarbonate and having an increased content of UV absorbers.

A problem that occurs repeatedly in the extrusion of such sheets is the precipitation of volatile constituents from the moulding composition.

In the machines used to produce the sheets, volatile constituents are precipitated on calibrators in the extrusion of multi-wall sheets and on rollers in the extrusion of solid sheets. Both can result in faults on the surface of the sheets.

Volatile constituents are, for example, UV absorbers, mould-release agents and other low molecular weight constituents of the compositions containing polycarbonate.

EP-A 0 320 632 describes co-extruded sheets of compositions containing polycarbonate, which contain a low-volatile UV absorber and may additionally contain a lubricant. A disadvantage is that, with a relatively long extrusion time, the surface of the sheets is impaired especially in the case of co-extrusion. That is caused, for example, by evaporations from the polycarbonate melt.

The increased release of the UV absorber from the polycarbonate melt leads to the formation of a coating on the calibrator or the rollers and, ultimately, to the formation of faults in the surface of the sheets (e.g. white spots, ripples, etc.). At the calibrator, polycarbonate abrasion additionally leads to powdery deposits on the co-extruded polycarbonate sheets.

From WO 99/05205 it is known that mould-release agent mixtures, for example consisting of fatty acid esters of pentaerythritol and of glycerol, can be used to minimise the formation on the calibrator or the rollers of a coating which leads to the formation of faults (e.g. white spots, ripples, etc.) in the surface of the sheet.

The use of various UV absorbers based on substituted triazines for polycarbonate is known; for example from JP-A 09-176476, JP-A 09-057881, JP-A 09-057813 and EP-A 0 825 226.

JP-A 09-176 476 describes polycarbonate compositions containing triazines and sheets and films coated therewith.

JP-A 09-057 881 describes plastics corrugated sheets coated with polycarbonate compositions containing triazines.

JP-A 09-057 813 describes a specific process for the production of polycarbonate sheets that contain triazines in the cover layer.

EP-A 0 649 724 describes a process for the production of multi-layer plastics panels from branched polycarbonates having molecular weights Mw of from 27,000 to 29,500 g/mol by co-extrusion of a core layer and at least one cover layer containing from 1 to 15 wt. % of a UV absorber. If in the moulding compositions for producing those plastics panels there are used the mould-release agents, described in EP-A 0 300 485, glycerol monostearate, pentaerythritol tetrastearate and mixtures thereof with glycerol monostearate as the main component, an impairment of the surfaces of the sheets nevertheless occurs with time.

Accordingly, the object of the present invention is to provide compositions containing polycarbonate that do not exhibit the mentioned disadvantages of the prior art when extruded or co-extruded.

A further object of the present invention is to provide products, especially multi-layer sheets, containing the compositions according to the invention.

The object according to the invention is achieved by the use of compounds of formula (I)

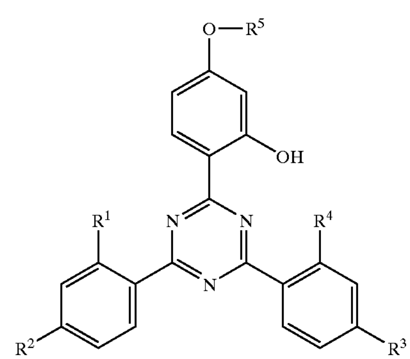

(I)

wherein $R^1$, $R^2$, $R^3$ and $R^4$ are the same or different and are selected from the group consisting of $C_1$-alkyl to $C_8$-alkyl, halogen and —CN, and $R^5$ is H or $C_1$-alkyl to $C_{20}$-alkyl, in the preparation of compositions containing polycarbonate and fatty acid esters and one or more compounds of formula (I).

Preferably, $R^5$ is n-octyl.

Also preferably, $R^1$, $R^2$, $R^3$ and $R^4$ are methyl. Particularly preferably, $R^5$ is n-octyl and $R^1$, $R^2$, $R^3$ and $R^4$ are methyl.

The object according to the invention is also achieved by compositions containing polycarbonate and fatty acid esters and one or more compounds of formula (I).

In a preferred embodiment of the present invention, the compositions according to the invention contain from 0.02 to 1 wt. % fatty acid esters. Those esters are preferably selected from the group consisting of pentaerythritol tetrastearate, glycerol monostearate and mixtures of the two.

In a preferred embodiment of the present invention, the compositions according to the invention additionally contain from 10 ppm to 3000 ppm thermostabilisers.

The thermostabilisers are preferably selected from the group consisting of tris-(2,4-di-tert-butylphenyl) phosphite and triphenylphosphine.

The object according to the invention is also achieved by a method of producing products containing a composition according to the invention by extrusion or co-extrusion or injection moulding. Extrusion or co-extrusion are preferred.

The object according to the invention is also achieved by a product containing a composition according to the invention.

The object according to the invention is also achieved by a multi-layer product, wherein at least one of the outer layers contains a composition according to the invention.

The object according to the invention is also achieved by a product containing a composition according to the invention, the product being selected from the group consisting of sheet, solid sheet, multi-wall sheet, corrugated solid sheet, corrugated multi-wall sheet, multi-wall profile, glazing, glazing for greenhouses, conservatory, bus stop, advertising hoarding, sign, protective glazing, motor vehicle glazing, window and roofing.

Particularly preferred products according to the invention are multi-layer sheets that contain a composition according to the invention in at least one of the two outer layers.

The products according to the invention contain a composition according to the invention. Preferably, they consist substantially of a composition according to the invention. Particularly preferably, they consist of a composition according to the invention. In the case of multi-layer products, that applies to one or more layers of the product.

The composition according to the invention is preferably applied in the form of a cover layer having a thickness of preferably from 5 to 80 $\mu$m to a polycarbonate sheet, application preferably being effected by means of co-extrusion.

The compositions according to the invention preferably contain from 1 to 7 wt. %, particularly preferably from 2 to 5 wt. %, compounds of formula (I).

The preparation of the compounds of formula (I) may be effected by known processes. It may be carried out, for example, according to WO 00/14075, U.S. Pat. No. 556 973, U.S. Pat. No. 5,648,488 or U.S. Pat. No. 5,675,004. Particular examples of the compounds of formula (I) are commercially available, for example under the name Cyasorb® UV 1164 from Cytec Industries B. V., Botlek, Netherlands.

The compositions containing polycarbonate according to the invention have proved to be especially advantageous. They can be processed without difficulty and do not impair the goods obtained as the product. Surprisingly, it has been found that, when those compounds are used, the problems described at the beginning do not arise even when additives that are known to be volatile are added to compositions containing polycarbonate.

According to the invention, polycarbonates are homopolycarbonates, copolycarbonates or thermoplastic polyester carbonates. They preferably have mean molecular weights $\overline{M}_w$ of from 18,000 to 40,000 g/mol, preferably from 26,000 to 36,000 g/mol and especially from 28,000 to 35,000 g/mol, determined by measuring the relative solution viscosity in dichloromethane or in mixtures of equal amounts by weight of phenol/o-dichlorobenzene calibrated by light scattering.

The melt viscosity of the composition containing polycarbonate is preferably to be less than that of the substrate to which it is applied, where multi-layer products are produced.

For the preparation of polycarbonates for the compositions containing polycarbonate, reference is made, for example, to "Schnell", Chemistry and Physics of Polycarbonates, Polymer Reviews, Vol. 9, Interscience Publishers, New York, London, Sydney 1964, to D. C. PREVORSEK, B. T. DEBONA and Y. KESTEN, Corporate Research Center, Allied Chemical Corporation, Moristown, N.J. 07960, "Synthesis of Poly(ester)carbonate Copolymers" in Journal of Polymer Science, Polymer Chemistry Edition, Vol. 19, 75–90 (1980), to D. Freitag, U. Grigo, P. R Müller, N. Nouvertne, BAYER AG, "Polycarbonates" in Encyclopedia of Polymer Science and Engineering, Vol. 11, Second Edition, 1988, pages 648–718, and finally to Dres. U. Grigo, K. Kircher and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117–299.

The preparation is preferably carried out by the phase boundary process or the melt transesterification process and is described by way of example with reference to the phase boundary process.

Compounds that are preferably to be used as starting materials are bisphenols of the general formula HO-Z-OH, wherein Z is a divalent organic radical having from 6 to 30 carbon atoms, which contains one or more aromatic groups.

Examples of such compounds are bisphenols belonging to the group of the dihydroxydiphenyls, bis(hydroxyphenyl) alkanes, indanebisphenols, bis(hydroxyphenyl) ethers, bis (hydroxyphenyl)sulfones, bis(hydroxyphenyl) ketones and $\alpha,\alpha'$-bis(hydroxyphenyl)-diisopropylbenzenes.

Particularly preferred bisphenols belonging to the above-mentioned groups of compounds are bisphenol A, tetraalkylbisphenol A, 4,4-(meta-phenylenediisopropyl) diphenol (bisphenol M), 4,4-(para-phenylenediisopropyl) diphenol, 1,1-bis-(4-hydroxyphenyl)-3,3,5-trimethylcyclohexane (BP-TMC), and optionally mixtures thereof.

Particularly preferred polycarbonates are homopolycarbonates based on bisphenol A and copolycarbonates based on the monomers bisphenol A and 1,1-bis-(4-hydroxyphenyl)-3,3,5-trimethylcyclohexane.

The bisphenols to be used according to the invention are reacted with carbonic acid compounds, especially phosgene, or, in the case of the melt transesterification process, with diphenyl carbonate or dimethyl carbonate.

Polyester carbonates are obtained by reaction of the above-mentioned bisphenols, at least one aromatic dicarboxylic acid and, optionally, carbonic acid equivalents.

Suitable aromatic dicarboxylic acids are, for example, phthalic acid, terephthalic acid, isophthalic acid, 3,3'- or 4,4'-diphenyldicarboxylic acid and benzophenonedicarboxylic acids. Up to 80 mol %, preferably from 20 to 50 mol %, of the carbonate groups in the polycarbonates may be replaced in the case of polyester carbonates by aromatic dicarboxylic acid ester groups.

Inert organic solvents used in the phase boundary process are, for example, dichloromethane, the various dichloroethanes and chloropropane compounds, tetrachloromethane, trichloromethane, chlorobenzene and chlorotoluene, with preference being given to the use of chlorobenzene or dichloromethane or mixtures of dichloromethane and chlorobenzene.

The phase boundary reaction may be accelerated by means of catalysts such as tertiary amines, especially N-alkylpiperidines or onium salts. Tributylamine, triethylamine and N-ethylpiperidine are preferably used.

In the case of the melt transesterification process, the catalysts mentioned in DE-A 42 38 123 are preferably used.

The polycarbonates may be branched in a deliberate and controlled manner by the use of small amounts of brancling agents. Some suitable branching agents are: phloroglucinol, 4,6-dimethyl-2,4,6-tri-(4-hydroxyphenyl)-2-heptene; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-bis-(4-hydroxyphenyl)-cyclohexyl]-propane; 2,4-bis-(4-bydroxyphenyl-isopropyl)-phenol; 2,6-bis-(2-hydroxy-5'-methyl-benzyl)-4-methylphenol; 2-(4-hydroxyphenyl)-2-(2,4-dihydroxyphenyl)-propane; hexa-(4-(4-hydroxyphenyl-isopropyl)-phenyl)-orthoterephthalic acid ester; tetra-(4-hydroxyphenyl)-methane; tetra-(4-(4-hydroxy-phenyl-isopropyl)-phenoxy)-methane; $\alpha,\alpha',\alpha''$-tris-(4-hydroxyphenyl)-1,3,5-triiso-propylbenzene; 2,4-dihydroxybenzoic acid; trimesic acid; cyanuric chloride; 3,3-bis-(3-methyl-4-hydroxyphenyl)-2-oxo-2,3-dihydroindole; 1,4-bis-(4',4''-dihydroxytri-phenyl)-methyl)-benzene and especially: 1,1,1 -tri-(4-hydroxyphenyl)-ethane and bis-(3-methyl-4-hydroxyphenyl)-2-oxo-2,3-dihydroindole.

The from 0.05 to 2 mol %, based on bisphenols used, of branching agents or mixtures of branching agents that are optionally to be used concomitantly may be used together with the bisphenols or, alternatively, may be added at a later stage of the synthesis.

Chain terminators may be employed. There are used as chain terminators preferably phenols, such as phenol, alkylphenols, such as cresol and 4-tert-butylphenol, chlorophenol, bromophenol, cumylphenol, or mixtures thereof, in amounts of preferably from 1 to 20 mol %, particularly preferably from 2 to 10 mol %, per mol of bisphenol. Phenol, 4-tert-butylphenol and cumylphenol are preferred.

Chain terminators and branching agents may be added to the syntheses separately or alternatively together with the bisphenol.

The preparation of the polycarbonates for the compositions containing polycarbonate according to the invention by the melt transesterification process is described by way of example in DE-A 42 38 123.

The incorporation of the UV absorbers, especially the incorporation of the compounds of formula (I), into the compositions containing polycarbonate according to the invention is carried out by conventional methods, for example by mixing solutions of the UV absorbers with solutions of the polycarbonates in suitable organic solvents, such as $CH_2Cl_2$, haloalkanes, haloaromatic compounds, chlorobenzene and xylenes. The mixtures of substances are then preferably homogenised in a known manner by extrusion; the solution mixtures are removed, for example compounded, in a known manner, for example by evaporation of the solvent and subsequent extrusion.

The compositions containing polycarbonate may additionally contain stabilisers.

Suitable stabilisers for the polycarbonates for the compositions containing polycarbonate according to the invention are, for example, phosphines, phosphites or Si-containing stabilisers and other compounds described in EP-A 0 500 496. There may be mentioned by way of example triphenyl phosphites, diphenylalkyl phosphites, phenyldialkyl phosphites, tris-(nonylphenyl) phosphite, tetrakis-(2,4-di-tert-butylphenyl)-4,4'-biphenylene diphosphonite and triaryl phosphite. Triphenylphosphine and tris-(2,4-di-tert-butylphenyl) phosphite are particularly preferred.

The moulding composition according to the invention contains fatty acid esters. They are (partial) esters of tetra- to hexa-hydric alcohols, especially of pentaerythritol.

Tetrahydric alcohols are, for example, pentaerythritol and mesoerytbritol.

Pentahydric alcohols are, for example, arabitol, ribitol and xylitol.

Hexahydric alcohols are, for example, mannitol, glucitol (sorbitol) and dulcitol.

The esters are the monoesters, diesters, triesters, tetraesters, optionally pentaesters and hexaesters or mixtures thereof, especially static mixtures, of saturated aliphatic $C_{10}$- to $C_{26}$-monocarboxylic acids, preferably with saturated aliphatic $C_{14}$- to $C_{22}$-monocarboxylic acids.

The commercially available fatty acid esters, especially of pentaerythritol, can contain <60% of different partial esters owing to the preparation.

Saturated aliphatic monocarboxylic acids having from 10 to 26 carbon atoms are, for example, capric acid, lauric acid, myristic acid, palmitic acid, stearic acid, arachic acid, behenic acid, lignoceric acid and cerotic acid.

Preferred saturated aliphatic monocarboxylic acids having from 14 to 22 carbon atoms are, for example, myristic acid, palmitic acid, stearic acid, arachic acid and behenic acid.

Saturated aliphatic monocarboxylic acids such as palmitic acid and stearic acid are particularly preferred.

The saturated aliphatic $C_{10}$- to $C_{26}$-carboxylic acids and the fatty acid esters to be used according to the invention are either known as such in the literature or can be prepared according to processes known in the literature. Examples of pentaerythritol fatty acid esters are those of the particularly preferred monocarboxylic acids mentioned above.

Esters of pentaerythritol with stearic acid and palmitic acid are particularly preferred.

The moulding composition according to the invention may also contain glycerol mono-fatty acid esters. Glycerol mono-fatty acid esters are esters of glycerol with saturated aliphatic $C_{10}$- to $C_{26}$-monocarboxylic acids, preferably with saturated aliphatic $C_{14}$- to $C_{22}$-monocarboxylic acids. Their higher volatility no longer leads to the problems described at the beginning in the case of the moulding composition according to the invention.

Glycerol mono-fatty, acid esters are to be understood as being both those of the primary OH function of glycerol and those of the secondary OH function of glycerol, as well as mixtures of those isomeric classes of compounds. The glycerol mono-fatty acid esters can contain <50% of different diesters and triesters of glycerol owing to the preparation.

Saturated aliphatic monocarboxylic acids having from 10 to 26 carbon atoms are, for example, capric acid, lauric acid, myristic acid, palmitic acid, stearic acid, arachic acid, behenic acid, lignoceric acid and cerotic acid.

Preferred saturated aliphatic monocarboxylic acids having from 14 to 22 carbon atoms are, for example, myristic acid, palmitic acid, stearic acid, arachic acid and behenic acid.

Particularly preferred saturated aliphatic monocarboxylic acids are palmitic acid and stearic acid.

The saturated aliphatic $C_{10}$- to $C_{26}$-carboxylic acids and the glycerol mono-fatty acid esters to be used according to the invention are either known as such in the literature or can be prepared according to processes known in the literature (see, for example, Fieser and Fieser, Organische Chemie GmbH, Weinheim, Bergstr. 1965, Chap. 30, page 1206 ff). Examples of glycerol mono-fatty acid esters are those of the particularly preferred monocarboxylic acids mentioned above.

The compositions containing polycarbonate may additionally contain antistatics. Examples of antistatics are cationic compounds, for example quaternary ammonium, phosphonium or sulfonium salts, anionic compounds, for example alkylsulfonates, alkyl sulfates, alkyl phosphates, carboxylates in the form of alkali metal or alkane earth metal salts, non-ionic compounds, for example polyethylene glycol esters, polyethylene glycol ethers, fatty acid esters, ethoxylated fatty amines. Preferred antistatics are non-ionic compounds.

The compositions according to the invention and the products produced therefrom may also contain organic colouring agents, inorganic colouring pigments, fluorescent colouring agents and, particularly preferably, optical brightening agents.

All the materials and solutions used for the synthesis of the compositions containing polycarbonate according to the invention may be contaminated with corresponding impurities as a result of their preparation and storage, the aim being to work with starting materials that are as clean as possible.

The individual constituents may in a known manner be mixed either in succession or simultaneously, either at room temperature or at elevated temperature.

The additives are incorporated into the compositions containing polycarbonate in a known manner, for example by mixing polymer granules with the additives at temperatures of approximately from 200 to 330° C. in conventional apparatuses such as internal kneaders, extruders and double-shaft screws, for, example by melt-compounding or melt extrusion, or by mixing the solutions of the polymer with solutions of the additives and subsequently evaporating off the solvents in a known manner.

The amount of additives in the compositions containing polycarbonate may be varied within wide limits and is dependent on the desired properties of the compositions containing polycarbonate. The total amount of additives in the compositions containing polycarbonate is preferably up to 20 wt. %, especially from 0.2 to 12 wt. %, based on the weight of the compositions containing polycarbonate.

As is shown by the Examples according to the invention, the use of the compositions containing polycarbonate according to the invention as the co-extruded layer offers a significant advantage over any other compositions containing polycarbonate as the base material of sheets. That advantage occurs especially when the base material of the sheet is also provided with the UV absorber and the mould-release agent of the compositions containing polycarbonate according to the invention.

The compositions containing polycarbonate can be used in the production of solid plastics sheets and so-called multi-wall sheets (e.g. twin-wall sheets, triple-wall sheets, etc.). The sheets also include sheets that have on one side or on both sides an additional cover layer containing the composition containing polycarbonate according to the invention.

The compositions containing polycarbonate according to the invention permit the facilitated production of products, especially of sheets and products produced therefrom, such as, for example, glazing for greenhouses, conservatories, bus stops, advertising hoardings, signs, protective glazing, motor vehicle glazing, windows or roofing.

Subsequent treatment of products coated with the compositions containing polycarbonate according to the invention, such as, for example, deep-drawing or surface treatments such as, for example, the provision of scratch-resistant lacquers, water-spreading layers and the like, is possible, and the present invention also provides products produced by such processes.

Co-extrusion as such is known in the literature (see, for example, EP-A 0 110 221 and EP-A 0 110 238). It is preferably carried out as follows:

Extruders for producing the core layer and cover layer(s) are attached to a co-extrusion adapter. The adapter is so designed that the melt forming the cover layer is applied in the form of a thin layer that adheres to the melt of the core layer.

The multi-layer molten extrudate so formed is then brought into the desired form (multi-wall or solid sheet) in the die connected.downstream. The melt is then cooled under controlled conditions in a known manner by means of calendering (solid sheet) or vacuum calibration (multi-wall sheet) and is then cut to length. A tempering oven for the elimination of stresses may optionally be provided downstream of the calibration. Instead of the adapter provided upstream of the die, the die itself may be in such a form that combination of the melt takes place there.

The invention is explained further by means of the Examples which follow, without being limited thereto.

EXAMPLES 10 mm twin-wall double sheets A–E, as are described, for example, in EP-A 0 110 238, were obtained from the following compositions containing polycarbonate: The base material used was Makrolon® KU 1-1243 (branched bisphenol A polycarbonate from Bayer AG, Leverkusen, Germany, having a melt flow index (MFR) of 6.5 g/10 min at 300° C. and under a load of 1.2 kg). The base material was co-extruded with the compounds shown in the Table based on Makrolon® 3100 (linear bisphenol A polycarbonate from Bayer AG, Leverkusen, Germany, having a melt flow index (MFR) of 6.5 g/10 min at 300° C. and under a load of 1.2 kg).

The thickness of the co-ex layer was in each case approximately 50 μm.

| Sheet | UV absorber | Mould-release agent | Thermostabiliser |
|---|---|---|---|
| A | 3.5% Tinuvin 360 ® | 0.1% PETS*)<br>0.05% GMS**) | — |
| B | 3.5% compound of formula (I) wherein $R^5$ = n-octyl and $R^1 = R^2 = R^3 = R^4$ = methyl | 0.1% PETS*)<br>0.05% GMS**) | — |
| C | 3.5% compound II | 0.1% PETS*)<br>0.05% GMS**) | — |
| D | 3.5% compound of formula (I) wherein $R^5$ = n-octyl and $R^1 = R^2 = R^3 = R^4$ = methyl | — | — |
| E | 3.5% compound of formula (I) wherein $R^5$ = n-octyl and $R^1 = R^2 = R^3 = R^4$ = methyl | 0.1% PETS*)<br>0.05% GMS**) | 0.05% Irgafos 168***) |

*)Pentaerythritol tetrastearate, commercially available, for example, as Loxiol ® EP 129 from Cognis, Düsseldorf, Germany.
**)Glycerol monostearate, commercially available, for example, as Loxiol ® VPG 861 from Cognis, Düsseldorf, Germany.
***)Tris-(2,4-di-tert-butylphenyl) phosphite from Ciba Spezialitätenchemie, Lampertheim, Germany.
Tinuvin ® 360 is 2,2-methylenebis-(4-(1,1,3,3-tetramethylbutyl)-6-(2H-benztriazol-2-yl)phenol.
Compound II (commercially available as Tinuvin ® 1577):

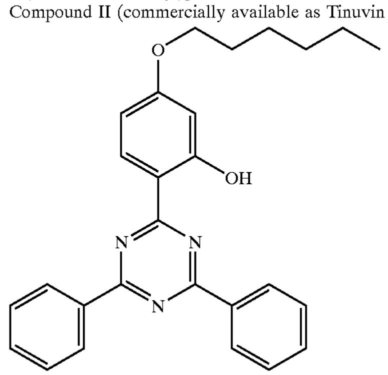

The machines and apparatuses used to produce the multi-layer sheets are described below:

The device consisted of the main extruder having a screw of length 33 D and a diameter of 70 mm with degassing the co-ex adapter (feedblock system)

a co-extruder for applying the cover layer having a screw of length 25 D and a diameter of 30 mm the special sheet die having a width of 350 mm the calibrator the roller conveyor the take-off device the device for cutting to length (saw)

the delivery table.

The polycarbonate granules of the base material were fed to the feeding funnel of the main extruder, and the UV co-extrusion material was fed to that of the co-extruder. Melting down and feeding of the material in question took place in the respective cylinder/screw plastification system. The two material melts were brought together in the co-ex adapter and, after leaving the die and cooling in the calibrator, formed a composite. The other devices served to transport the extruded sheets, cut them to length and deposit them.

Co-Extrusion with A (Reference):

first relatively small deposits after 4 hours after 3 hours, slight transverse ripples which occur at irregular intervals and impair the quality of the sheets slightly.

After 4½ hours, slightly more pronounced transverse ripples.

Rating: good

Co-Extrusion with B:

no deposits over a test duration of 5 hours

Transverse rippling is very low over the entire duration of the test, so that the quality of the sheets is not impaired Rating: very good Co-Extrusion with C:

first slight deposits after 2 hours after 150 minutes, slight transverse ripples which occur at irregular intervals and impair the quality of the sheets slightly.

After 3.5 hours, pronounced transverse ripples.

Rating: poor

Co-Extrusion with D:

first relatively small deposits after 50 minutes after 60 minutes, slight transverse ripples which occur at irregular intervals and impair the quality of the sheets slightly.

After 3 hours, pronounced transverse ripples.

Rating: poor

Co-Extrusion With E:

no deposits over a test duration of 5 hours

Transverse rippling is very low over the entire duration of the test, so that the quality of the sheets is not impaired Rating: very good Example C shows that very poor sheet qualities are achieved with compound II.

The volatility of the compound of formula (I) and of compound (II) is very similar (Table 1). It was therefore to be expected that an equally poor surface quality would be achieved with the compound of formula (I), which is chemically very similar, when the same mould-release agent mixtures were used in compositions containing polycarbonate Surprisingly, however, it has been found that good sheet qualities could be produced with that compound over a markedly longer period of time. The sheet quality even remained better for a longer time than with the composition described in WO 99/05205 (here for sheet A).

A comparison of tests B and D shows that the co-extrusion leads to sheets of high quality only in the case of the ternary composition, owing to a surprising synergistic effect.

TABLE 1

Measurement of volatility by means of thermogravimetric analysis (TGA) according to ISO 7112 under nitrogen

| | Residual weight at | | |
|---|---|---|---|
| | 280° C. | 320° C. | 400° C. |
| Compound of formula (I): ($R^1 = R^2 = R^3 = R^4 = CH_3$; $R^5$ = n-octyl) | 99% | 95% | 39% |
| Compound (II) | 99% | 94% | 37% |

What is claimed is:

1. Composition containing polycarbonate at least one fatty acid ester and one or more compounds of formula (I)

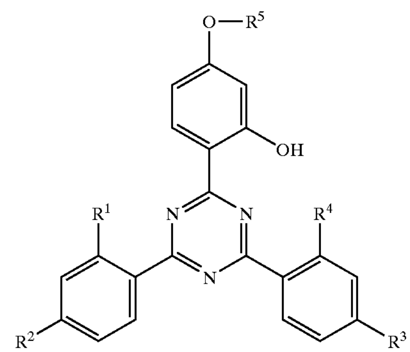

(I)

wherein $R^1$, $R^2$, $R^3$ and $R^4$ are the same or different and are selected from the group consisting of $C_1$-alkyl to $C_8$-alkyl, halogen and —CN, and $R^5$ is H or $C_1$-alkyl to $C_{20}$-alkyl.

2. Composition according to claim 1, wherein the concentration of the compounds of formula (I) in the composition is from 1 to 7 wt. %.

3. Composition according to claim 1 wherein the composition contains from 0.02 to 1 wt. % fatty acid ester.

4. Composition according to claim 3, wherein the fatty acid ester is at least one member selected from the group consisting of pentaerythritol tetrastearate, and glycerol monostearate.

5. Composition according to claim 1 wherein the composition additionally contains from 10 ppm to 3000ppm thermostabilizer.

6. Composition according to claim 5, wherein the thermostabilizer is at least one member selected from the group consisting of tris-(2,4-di-tert-butylphenyl) phosphite and tri-phenyiphosphine.

7. An article comprising the composition of claim 1.

8. An extruded article comprising the composition of claim 1.

9. An injection molded article comprising the composition of claim 1.

10. A process of producing an article comprising extruding the composition of claim 1.

11. A process of producing an article comprising injection molding the composition of claim 1.

12. A multi-layered article wherein at least one of the outer layers comprise the composition of claim 1.

* * * * *